US011502967B2

(12) United States Patent
Youn et al.

(10) Patent No.: US 11,502,967 B2
(45) Date of Patent: Nov. 15, 2022

(54) METHODS AND APPARATUSES FOR PACKET SCHEDULING FOR SOFTWARE-DEFINED NETWORKING IN EDGE COMPUTING ENVIRONMENT

(71) Applicant: RESEARCH & BUSINESS FOUNDATION SUNGKYUNKWAN UNIVERSITY, Suwon-si (KR)

(72) Inventors: Hee Yong Youn, Seongnam-si (KR); Hai Xue, Suwon-si (KR); Kyung Tae Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/925,394

(22) Filed: Jul. 10, 2020

(65) Prior Publication Data

US 2021/0029052 A1    Jan. 28, 2021

(30) Foreign Application Priority Data

Jul. 22, 2019  (KR) .......................... 10-2019-0088563

(51) Int. Cl.
  *H04L 47/50*  (2022.01)
  *H04L 45/64*  (2022.01)
  (Continued)

(52) U.S. Cl.
  CPC .............. *H04L 47/50* (2013.01); *H04L 45/38* (2013.01); *H04L 45/64* (2013.01); *H04L 47/2441* (2013.01)

(58) Field of Classification Search
  CPC ....... H04L 47/50; H04L 47/564; H04L 45/38; H04L 45/64; H04L 47/2441;
  (Continued)

(56) References Cited

U.S. PATENT DOCUMENTS 4,796,022 A * 1/1989 Schenkel .............. G06F 13/366
                                                         370/449
5,231,633 A * 7/1993 Hluchyj .............. H04Q 11/0478
                                                         370/902
(Continued)

FOREIGN PATENT DOCUMENTS

KR  10-2006-0127237 A    12/2006
WO  WO 2018/019367 A1    2/2018
WO  WO-2018042230 A1 *   3/2018

OTHER PUBLICATIONS

Xue et al., "Packet Scheduling for Multiple-Switch Software-Defined Networking in Edge Computing Environment," Nov. 18, 2018, Hindawi, Wireless Communications and Mobile Computing, vol. 2018, Article ID 7659085, 11 pages.
(Continued)

*Primary Examiner* — Mohamed A Kamara
(74) *Attorney, Agent, or Firm* — NSIP Law

(57) ABSTRACT

Provided are methods and apparatuses for packet scheduling for software-defined networking in an edge computing environment. A packet scheduling method according to an exemplary embodiment of the present disclosure comprises: receiving packets arriving at a queue connected to a switch in a software-defined network in an edge computing environment; moving the packets in the queue forward one position based on the order of arrival each time a packet is served by the switch; and if a new packet enters the switch while the buffer in the queue is full, pushing out the packet at the front and putting the new packet at the end of the queue.

20 Claims, 16 Drawing Sheets

(51) Int. Cl.
*H04L 47/2441* (2022.01)
*H04L 45/00* (2022.01)

(58) Field of Classification Search
CPC ... H04L 47/6275; H04L 47/622; H04L 49/90; H04L 49/70; H04L 49/9089; H04L 41/145; H04L 49/354
See application file for complete search history.

(56) References Cited

U.S. PATENT DOCUMENTS

| | | | | |
|---|---|---|---|---|
| 6,233,240 | B1* | 5/2001 | Barbas | H04L 47/30 370/233 |
| 6,247,058 | B1* | 6/2001 | Miller | H04L 47/10 370/429 |
| 6,430,160 | B1* | 8/2002 | Smith | H04L 41/142 709/224 |
| 8,208,380 | B1* | 6/2012 | Nachum | H04L 49/901 370/235 |
| 8,307,430 | B1* | 11/2012 | Chen | H04L 63/1458 726/22 |
| 10,237,181 | B2* | 3/2019 | Man | H04L 45/38 |
| 2007/0047586 | A1 | 3/2007 | Tieman et al. | |
| 2008/0101226 | A1* | 5/2008 | Albrecht | H04L 47/10 370/412 |
| 2012/0002678 | A1* | 1/2012 | Jonsson | H04L 47/245 370/412 |
| 2014/0023085 | A1* | 1/2014 | Aliseychik | H04L 49/103 370/412 |
| 2014/0185450 | A1 | 7/2014 | Luo et al. | |
| 2018/0077067 | A1* | 3/2018 | Dowlatkhah | H04L 12/4641 |
| 2018/0205656 | A1* | 7/2018 | Atli | H04L 47/30 |
| 2019/0014053 | A1 | 1/2019 | Huang et al. | |

OTHER PUBLICATIONS

Korean Office Action dated Jun. 2, 2020 in corresponding Korean Patent Application No. 10-2019-0088563 (5 pages in Korean).

* cited by examiner

METHODS AND APPARATUSES FOR PACKET SCHEDULING FOR SOFTWARE-DEFINED NETWORKING IN EDGE COMPUTING ENVIRONMENT

CROSS-REFERENCE TO RELATED APPLICATIONS

This application claims priority to Korean Patent Application No. 10-2019-0088563 filed on 22 Jul. 2019 in Korea, the entire contents of which are hereby incorporated by reference in their entirety.

BACKGROUND OF THE DISCLOSURE

1. Technical Field

The present disclosure relates to methods and apparatuses for packet scheduling for software-defined networking in an edge computing environment.

2. Description of Related Art

Nowadays, the traditional IP network can hardly deal with the huge volume of traffic generated in the rapidly growing Internet of Things (IoT). As an efficient solution to this issue, a new type of networking paradigm called software-defined networking (SDN) had been proposed. In SDN, the control plane and data plane of the network are decoupled, unlike the traditional network. The role of the switches in SDN is delivering the data packets, while the controller is installed separately for controlling the whole network. OpenFlow is one of the most popular protocols developed for the communication between the controller and switch in SDN, and it is only an open protocol.

The proliferation of IoT and the success of rich cloud service induced the horizon of a new computing paradigm called edge computing. Here, how to efficiently deliver the data from the IoT nodes to the relevant switches is a key issue. While there exist numerous nodes in the edge computing environment, some of them are deployed to detect critical events such as fire or earthquakes. For such peculiar edge nodes, the data must be delivered with the highest priority due to its importance. Therefore, effective priority-based scheduling and a robust queueing mechanism are imperative to maximize the performance of the network where the data processing occurs at the edge of the network. A variety of network traffics are also needed to be considered for accurately estimating the performance, allowing early identification of a potential traffic hot spot or bottleneck. This is a fundamental issue in the deployment of SDN for edge computing.

Recently, numerous studies have been conducted to maximize the performance of the controller and OpenFlow switch of SDN. However, to the best of our knowledge, little explorations exist for the performance of SDN switches with priority scheduling. This is an undoubtedly important issue for edge computing since the edge nodes deal with the received data based on the priority. Furthermore, priority scheduling is necessary with multiple switches.

SUMMARY

The present disclosure provides methods and apparatuses for packet scheduling for software-defined networking in an edge computing environment, which can significantly reduce wait time in consideration of various traffic characteristics by performing packet scheduling for multiple switches in software-defined networking in an edge computing network.

According to an exemplary embodiment of the present disclosure, there is provided a method for packet scheduling for software-defined networking in an edge computing environment, the method comprising: receiving packets arriving at a queue connected to a switch in a software-defined network in an edge computing environment; moving the packets in the queue forward one position based on the order of arrival each time a packet is served by the switch; and if a new packet enters the switch while the buffer in the queue is full, pushing out the packet at the front and putting the new packet at the end of the queue.

The switch may be multiple switches operating according the OpenFlow protocol in the software-defined network.

The packet may be modeled as following the arrival rate of the Poisson process, and the interarrival times of the packets may be independent and follow exponential distribution.

The average service time of the packets in the queue may comprise the time required for the processing of the packets which are waiting in the queue at the time of the packet arrival, and the time required for the processing of the packet in service.

The average service time of the packets in the queue may be calculated by the number of packets in the queue, the probability that the queue is busy, and the average residual lifetime of the service.

According to another exemplary embodiment of the present disclosure, there is provided a packet scheduling method executed by a packet scheduling apparatus for software-defined networking in an edge computing environment, the method comprising: receiving packets arriving at a queue connected to a switch in a software-defined network in an edge computing environment; moving the packets in the queue forward one position based on the order of arrival each time a packet is served by the switch; and if a new packet with the highest priority enters the switch while the buffer in the queue is full, pushing out the packet that waited longest and putting the new packet with the highest priority at the front of the queue.

The switch may be multiple switches operating according the OpenFlow protocol in the software-defined network.

The packet may be modeled as following the arrival rate of the Poisson process, and the interarrival times of the packets may be independent and follow exponential distribution.

The average service time of the packets in the queue may comprise the time taken for the packet currently in service to be finished, the time taken for the service of the packets in the queue having equal or higher priority, and the time taken for the service of the packets in the queue having higher priority.

The average service time of the packets in the queue may be calculated by the number of packets in the queue, the probability that the queue is busy, and the average residual lifetime of the service.

According to another exemplary embodiment of the present disclosure, there is provided a packet scheduling apparatus for software-defined networking in an edge computing environment, the apparatus comprising: a memory storing at least one program; and a processor connected to the processor, wherein the processor receives packets arriving at a queue connected to a switch in a software-defined network in an edge computing environment, moves the packets in the queue forward one position based on the order of arrival each time a packet is served by the switch, and, if a new packet enters the switch while the buffer in the queue is full, pushes out the packet at the front and puts the new packet at the end of the queue.

The switch may be multiple switches operating according the OpenFlow protocol in the software-defined network.

The packet may be modeled as following the arrival rate of the Poisson process, and the interarrival times of the packets may be independent and follow exponential distribution.

The average service time of the packets in the queue may comprise the time required for the processing of the packets which are waiting in the queue at the time of the packet arrival, and the time required for the processing of the packet in service.

The average service time of the packets in the queue may be calculated by the number of packets in the queue, the probability that the queue is busy, and the average residual lifetime of the service.

According to another exemplary embodiment of the present disclosure, there is provided a packet scheduling apparatus for software-defined networking in an edge computing environment, the apparatus comprising: a memory storing at least one program; and a processor connected to the processor, wherein the processor receives packets arriving at a queue connected to a switch in a software-defined network in an edge computing environment, moves the packets in the queue forward one position based on the order of arrival each time a packet is served by the switch, and, if a new packet with the highest priority enters the switch while the buffer in the queue is full, pushes out the packet that waited longest and puts the new packet with the highest priority at the front of the queue.

The switch may be multiple switches operating according the OpenFlow protocol in the software-defined network.

The packet may be modeled as following the arrival rate of the Poisson process, and the interarrival times of the packets may be independent and follow exponential distribution.

The average service time of the packets in the queue may comprise the time taken for the packet currently in service to be finished, the time taken for the service of the packets in the queue having equal or higher priority, and the time taken for the service of the packets in the queue having higher priority.

The average service time of the packets in the queue may be calculated by the number of packets in the queue, the probability that the queue is busy, and the average residual lifetime of the service.

DESCRIPTION OF EXEMPLARY EMBODIMENTS

Figure 1:
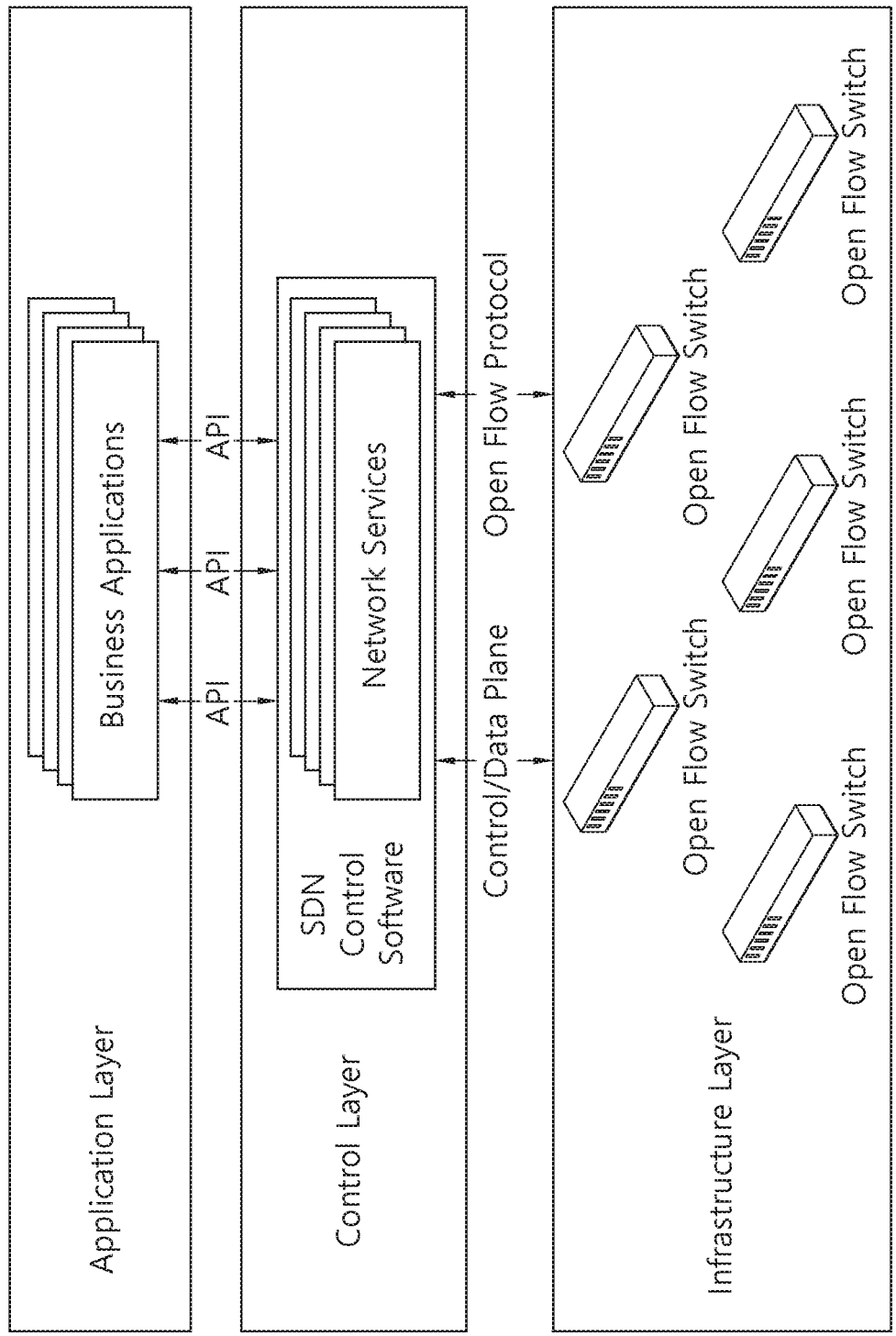
FIG. 1 is a view illustrating a three-layer structure of software-defined networking to which an exemplary embodiment of the present disclosure is applied.

Various modifications and various embodiments can be made in the present disclosure, so that specific embodiments are illustrated in the drawings and described in detail in the specification.

It should be understood, however, that it is not intended to limit the present disclosure to the particular disclosed forms, but includes all modifications, equivalents, and alternatives falling within the sprit and technical scope of the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the terms "and/or" include a combination of a plurality of related listed items or any of the plurality of related listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise", "include", and "have" specify the presence of stated features, numbers, steps, operations, elements, or combinations thereof, but do not preclude the presence or addition of one or more other features, numbers, steps, operations, elements, and combinations thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

FIG. 1 is a view illustrating a three-layer structure of software-defined networking to which an exemplary embodiment of the present disclosure is applied.

SDN decouples the control logic from the underlying routers and switches. It promotes the logical centralization of network control and introduces the capability of programming the network. As a result, flexible, dynamic, and programmable functionality of network operations could be offered. However, the merits are achieved with the sacrifice on essential network performance such as packet processing speed and throughput, which is attributed to the involvement of a remote controller for the administration of all forwarding devices.

SDN will be described. SDN was originated from a project of UC Berkeley and Stanford University. In SDN, the network control plane making decisions on traffic routing and load balancing is decoupled from the data plane forwarding the traffic to the destination. The network is directly programmable, and the infrastructure is allowed to be abstracted for flexibly supporting various applications and services. There exist three layers in SDN unlike the traditional network of two layers, and a typical structure of SDN based on the OpenFlow protocol is depicted in FIG. 1.

The separation of control plane and data plane can be realized by means of a well-defined programming interface between the controller and switches. The controller exercises direct control covering the state of the data plane elements via a well-defined application programming interface (API) as shown in FIG. 1. The most notable example of such API is depicted in FIG. 2.

Figure 2:
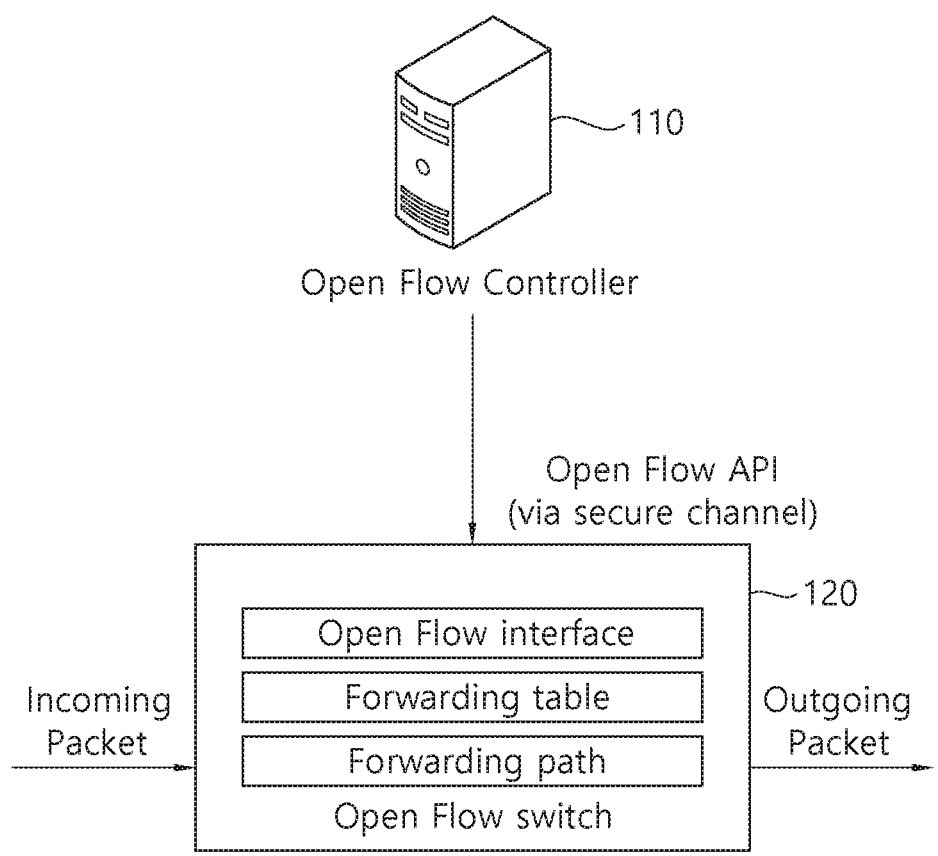
FIG. 2 is a view illustrating a structure of an OpenFlow protocol used in an exemplary embodiment of the present disclosure.

FIG. 2 is a view illustrating a structure of an OpenFlow protocol used in an exemplary embodiment of the present disclosure.

There exists one or more tables of packet-handling rules (flow table) in an OpenFlow switch 120. Each entry of a flow table consists of mainly six fields as listed in Table 1. The rule is matched with a subset of the traffic, and proper actions such as dropping, forwarding, and modifying are applied to the traffic. The flow tables are used to determine how to deal with the incoming packets.

TABLE 1

| Field | Description |
| --- | --- |
| Match | Port, packet header, and metadata forwarded from the previous flow table |
| Priority | Matching precedence of the entry |
| Counter | Statistics for matching the packets |
| Instruction | Action or pipeline processing |
| Timeout | Maximum effective time or free time before the entry is overdue |
| Cookie | Opaque data sent by the OpenFlow controller |

The communication protocol between an OpenFlow controller 110 and an OpenFlow switch 120 is particularly important due to the decoupling of the two planes. The OpenFlow protocol is widely used for SDN, which defines the API for the communication between them, as illustrated in FIG. 2.

In SDN, the controller 110 manipulates the flow tables of the switch 120 by adding, updating, and deleting the flow entries. The operation occurs either reactively as the controller 110 receives a packet from the switch 120 or proactively according to the implementation of the OpenFlow controller. A secure channel is supported for the communication between the controller 110 and switch 120. The OpenFlow switch 120 supports the flow-based forwarding by keeping one or more flow tables.

Edge Computing will be described. With the new era of computing paradigm called edge computing, data are transferred to the network edge for the service including analytics. As a result, computing occurs close to the data sources. The number of sensor nodes deployed on the surroundings is rapidly increasing due to the prevalence of IoT in recent years. Edge computing is an emerging ecosystem which aims at converging telecommunication and IT services, providing a cloud computing platform at the edge of the whole network. It offers storage and computational resources at the edge, reducing the latency and increasing resource utilization.

As the futuristic vision of IoT, the latest development of SDN could be integrated with edge computing to provide more efficient service. Here, how to make the edge nodes more efficient in processing the data is a matter of great concern. Besides, it is essential to accurately estimate the performance of the OpenFlow switch 120 for better usage. While more than thousands of edge nodes may exist in the real environment, some of them are deployed in the critical area whose data must be processed with high priority. Therefore, priority-based scheduling is inevitable to dynamically control the operation of the network considering the property of the traffics.

Figure 3:
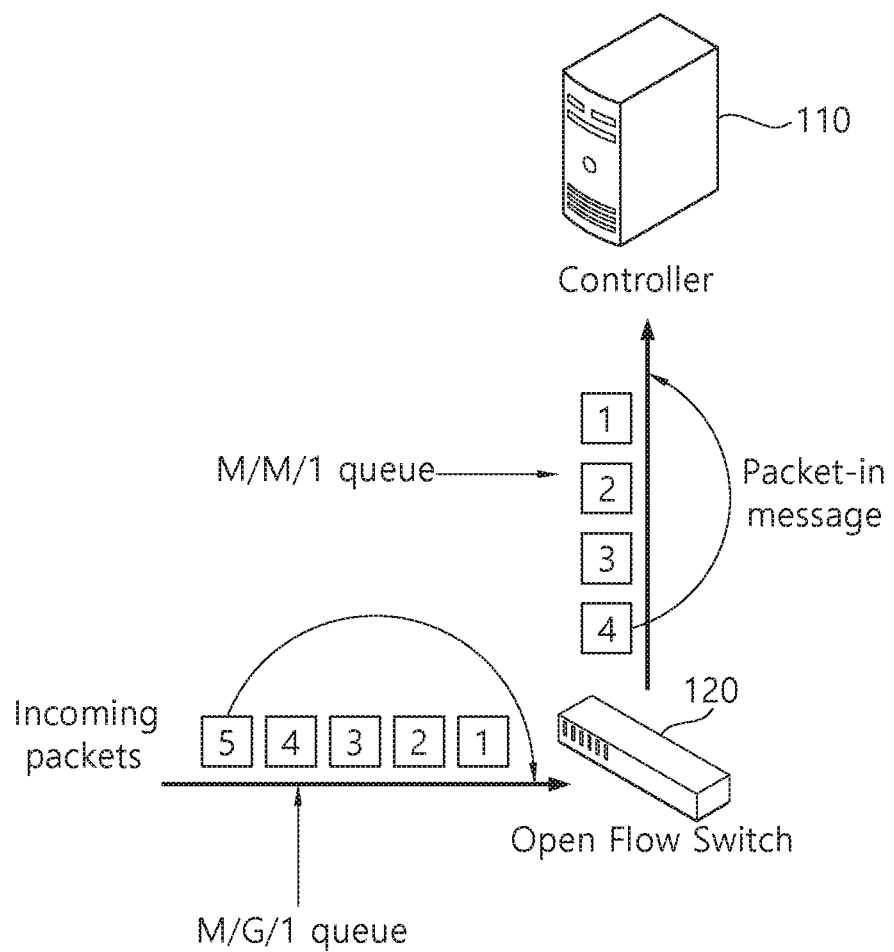
FIG. 3 is a view illustrating an operation of a single switch and controller according to an exemplary embodiment of the present disclosure.

FIG. 3 is a view illustrating an operation of a single switch and controller according to an exemplary embodiment of the present disclosure.

SDN allows easy implementation of a new scheme on the existing network infrastructure by decoupling the control plane from the data plane and connecting them via an open interface. The SDN of a single switch 120 and controller 110 is depicted in FIG. 3.

Both the controller 110 and switch 120 support the OpenFlow protocol for the communication between them. When a packet arrives at the OpenFlow switch 120, the switch 120 performs lookup with its flow tables. If a table entry matches, the switch 120 forwards the packet in the conventional way. Otherwise, the switch 120 requests the controller 110 for the instruction by sending a packet-in message, which encapsulates the packet information. The controller 110 then determines the rule for it, which is installed in other switches. After that, all the packets belonging to the flow are forwarded to the destination without requesting the controller 110 again.

Figure 4:
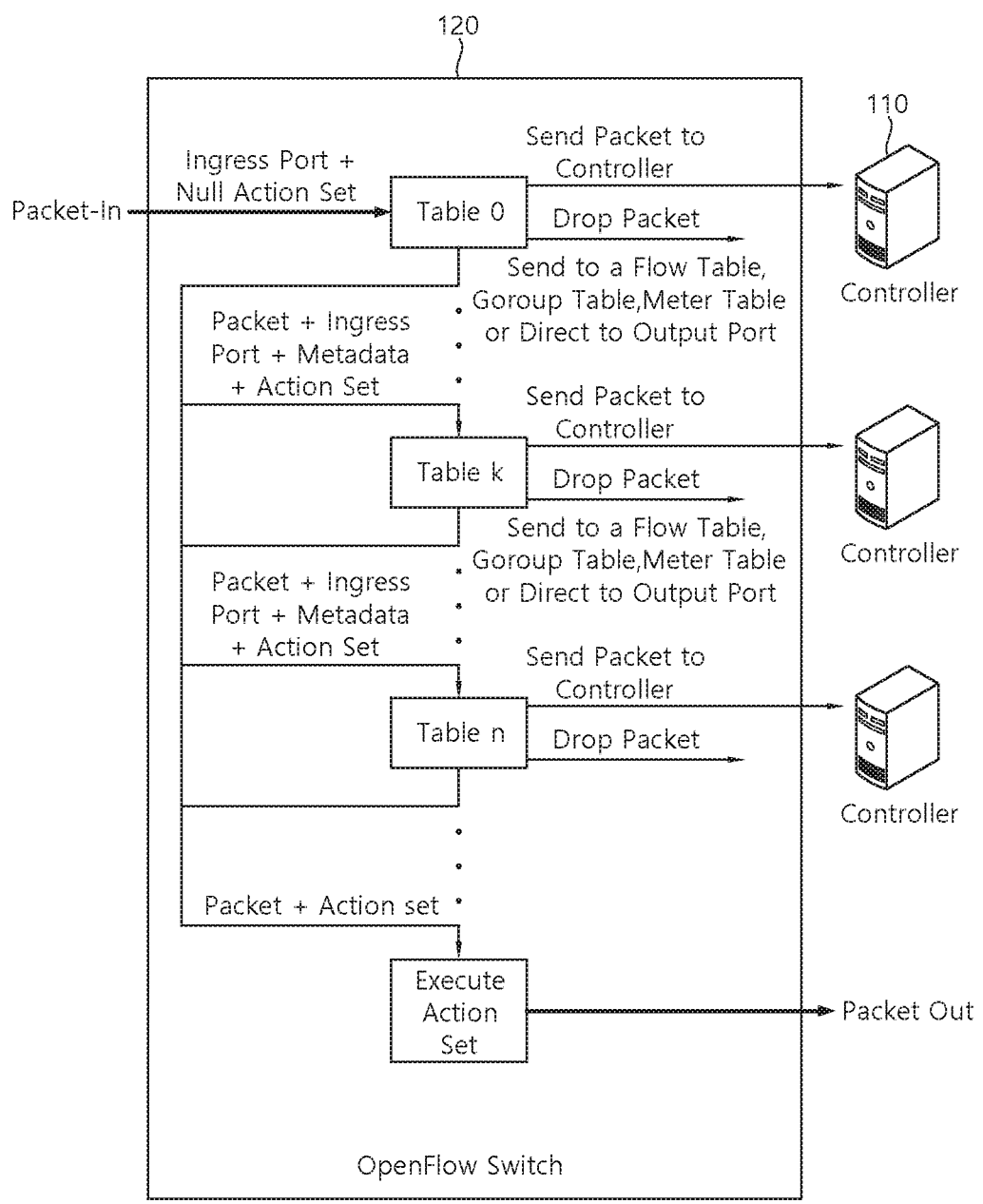
FIG. 4 is a view illustrating a process of packet matching operation used in an exemplary embodiment of the present disclosure.

FIG. 4 is a view illustrating a process of packet matching operation used in an exemplary embodiment of the present disclosure.

The process of packet matching operation is illustrated in FIG. 4. Notice that both the incoming packets and packet-in messages are queued. Here, the incoming packets and packet-in messages are handled with the M/G/1 model and M/M/1 model, respectively.

As depicted in FIG. 4, the incoming packets to the OpenFlow switch 120 are queued, and they are scheduled by either the FCFS or FCFS with priority (FCFS-P) scheduling policy. FCFS is applied for regular traffic, while FCFS-P is applied for urgent packets. In the FCFS M/G/1 queueing system, the average sojourn time of a packet consists of two components. The first component is the time required for the processing of the packets which are waiting in the queue at the time of the packet arrival, and the second one is the time required for the processing of the packet in service. The second component is non zero if the system is busy, while it is zero if the system is empty. Considering the two components, the average sojourn time of a packet with FCFS scheduling is obtained as in the following [Equation 1]. With the M/G/1 queue, $\lambda$ is the arrival rate of the Poisson process and x is average service time.

$$S = N_q \bar{x} + \rho \frac{\bar{x}^2}{2\bar{x}} \qquad \text{[Equation 1]}$$

Here $N_q$ is the number of packets in the queue, $\rho$ is the probability that the queue is busy, and $\overline{x^2}/(\overline{2x})$ is the average residual lifetime of the service.

By adopting Little's equation and the P-K (Pollaczek and Khinchin) equation, [Equation 1] can be expressed as in the following [Equation 2]:

$$S = x + \frac{\lambda \bar{x}^2}{2(1-\rho)} \qquad \text{[Equation 2]}$$

The model for FCFS-P is different from the FCFS M/G/1 queue due to the out-of-order operation. There exist several classes of packets having different Poisson arrival rates and service times. Assuming that there are m classes, $\bar{x}_i$ and $\lambda_i$ are average service time and arrival rate of class-i, respectively. The time fraction of the system working on class-i is then $\rho_i = \lambda_i \bar{x}_i$. The packets are processed according to the priority with preemptive node, while the class of a smaller number is given higher priority.

In the M/G/1 queueing system of FCFS-P, the average sojourn time of an incoming packet consists of three components. The first component is the time taken for the packet currently in service to be finished, $S_0$. The second one is the time taken for the service of the packets waiting in the queue whose priority is higher than or equal to it. The third component is for the service of the packets arriving after itself but having higher priority. The number of packets of class-m is $\lambda m S m$ according to Little's result theorem. Hence, the sojourn time of the FCFS-PM/G/1queueing system is as in the following [Equation 3]:

$$S_m = S_0 + \sum_{i=1}^{m} \bar{x}_i(\lambda_i S_i) + \sum_{i=1}^{m-1} \bar{x}_i(\lambda_i S_i) \qquad \text{[Equation 3]}$$

[Equation 3] can be solved by recursively applying the equation as follows:

$$\sigma_m = \sum_{i=1}^{m} \rho_i \qquad \text{[Equation 4]}$$

$$S_m = \frac{S_0}{(1-\sigma_m)(1-\sigma_{m-1})} \qquad \text{[Equation 5]}$$

With preemptive scheduling, So is due to the packets of higher priority. Therefore, it can be expressed as in the following [Equation 6]:

$$S_0 = \sum_{i=1}^{m} \rho_i \frac{\bar{x}_i^2}{2\bar{x}_i} \qquad \text{[Equation 6]}$$

Figure 5:
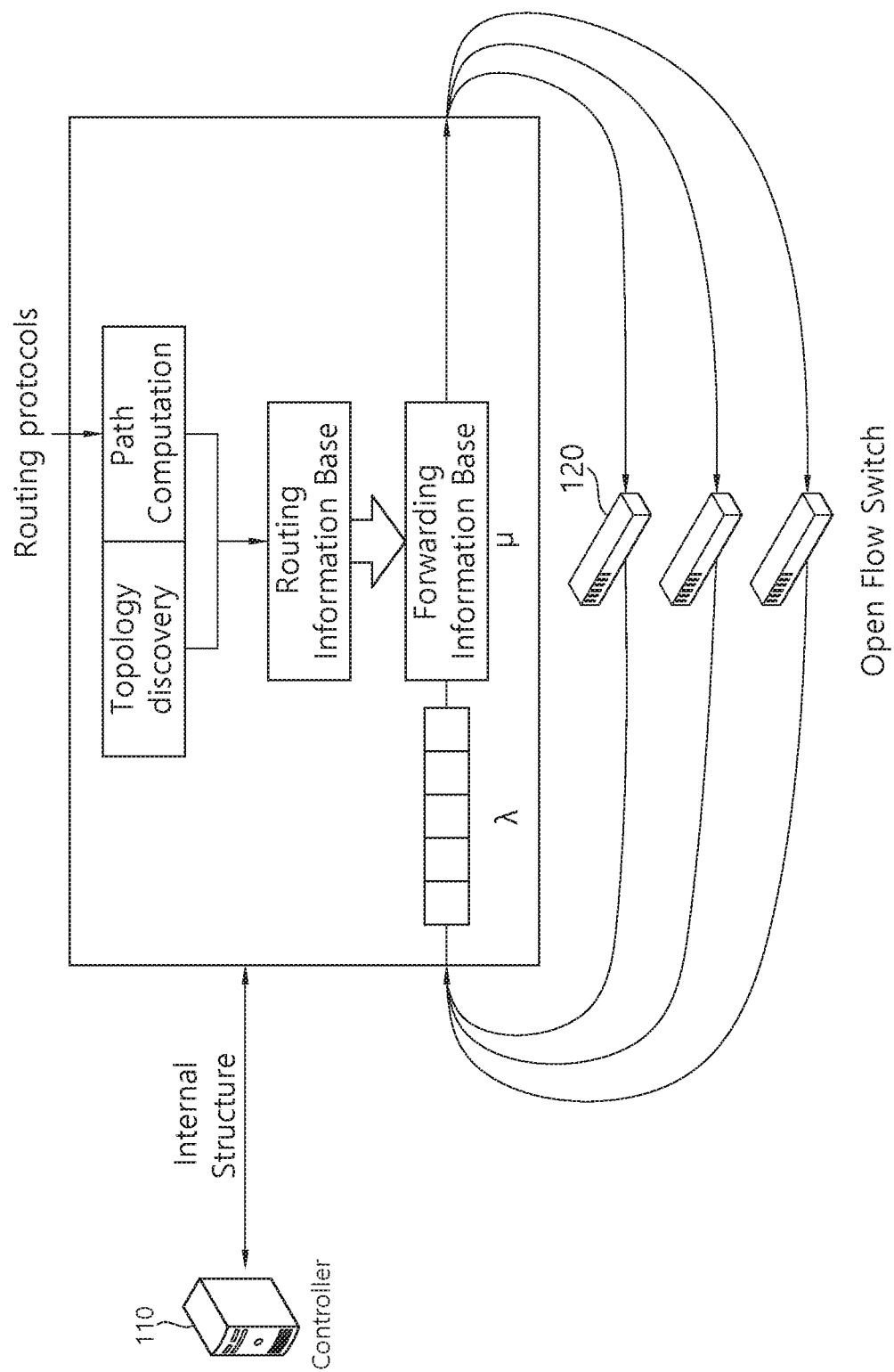
FIG. 5 is a view showing a processing operation of a packet-in message in an SDN controller according to an exemplary embodiment of the present disclosure.

FIG. 5 is a view showing a processing operation of a packet-in message in an SDN controller according to an exemplary embodiment of the present disclosure.

The packet-in message will be described.

As previously stated, the OpenFlow switch 120 sends a packet-in message to the relevant controller 110 as a flow setup request when a packet fails to match the flow table. The diagram of the processing of the packet-in message is illustrated in FIG. 5. Notice that the process of packet-in message has a one-to-one correspondence with the process of flow arrival regardless of the number of switches 120 connected to the controller 110. Each flow arrival is assumed to follow the Poisson distribution. Therefore, the packet-in messages coming from several switches 120 constitute a Poisson stream by the superposition theorem.

Figure 6:
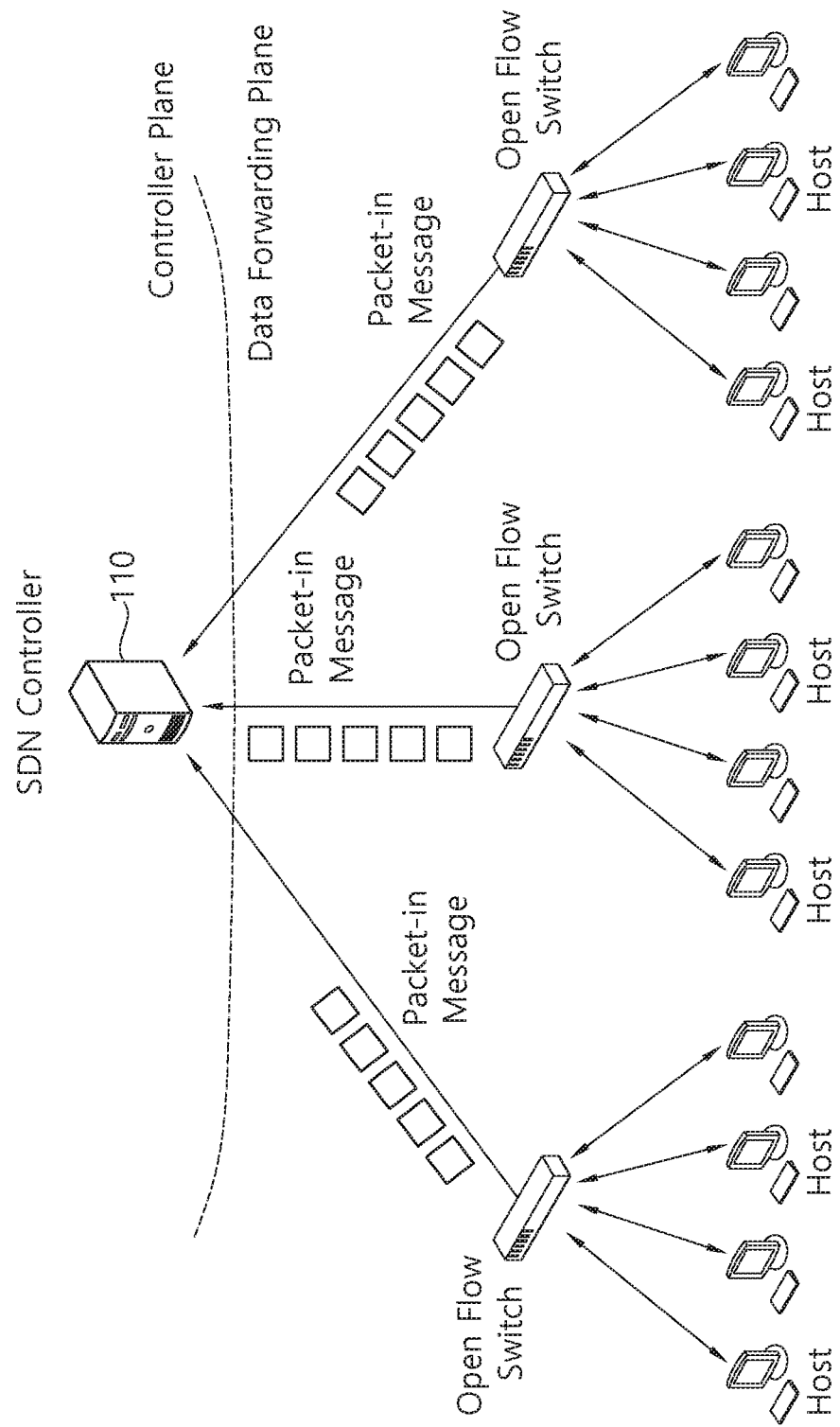
FIG. 6 is a view illustrating a structure of multiple switches in SDN according to an exemplary embodiment of the present disclosure.

FIG. 6 is a view illustrating a structure of multiple switches in SDN according to an exemplary embodiment of the present disclosure.

Priority scheduling with multiple switches will be described. As a basic structure, since SDN decouples the control plane and data forwarding plane, the data transmission consists of two types. One is from the edge nodes to the switches 120, and the other one is from a switch 120 to the remote controller 110 for the packet-in message. They are illustrated in FIG. 6.

There is at least one flow table in an OpenFlow switch 120, and the incoming packets are matched from the first flow table. Upon a match with a flow entry, the instruction set of the flow entry is executed. On table miss, there are three options: dropping, forwarding to the subsequent flow tables, and transmitting to the controller 110 as a packet-in message. One option is selected by the programmer when the flow tables are sent to the OpenFlow switches 120.

Figure 7:
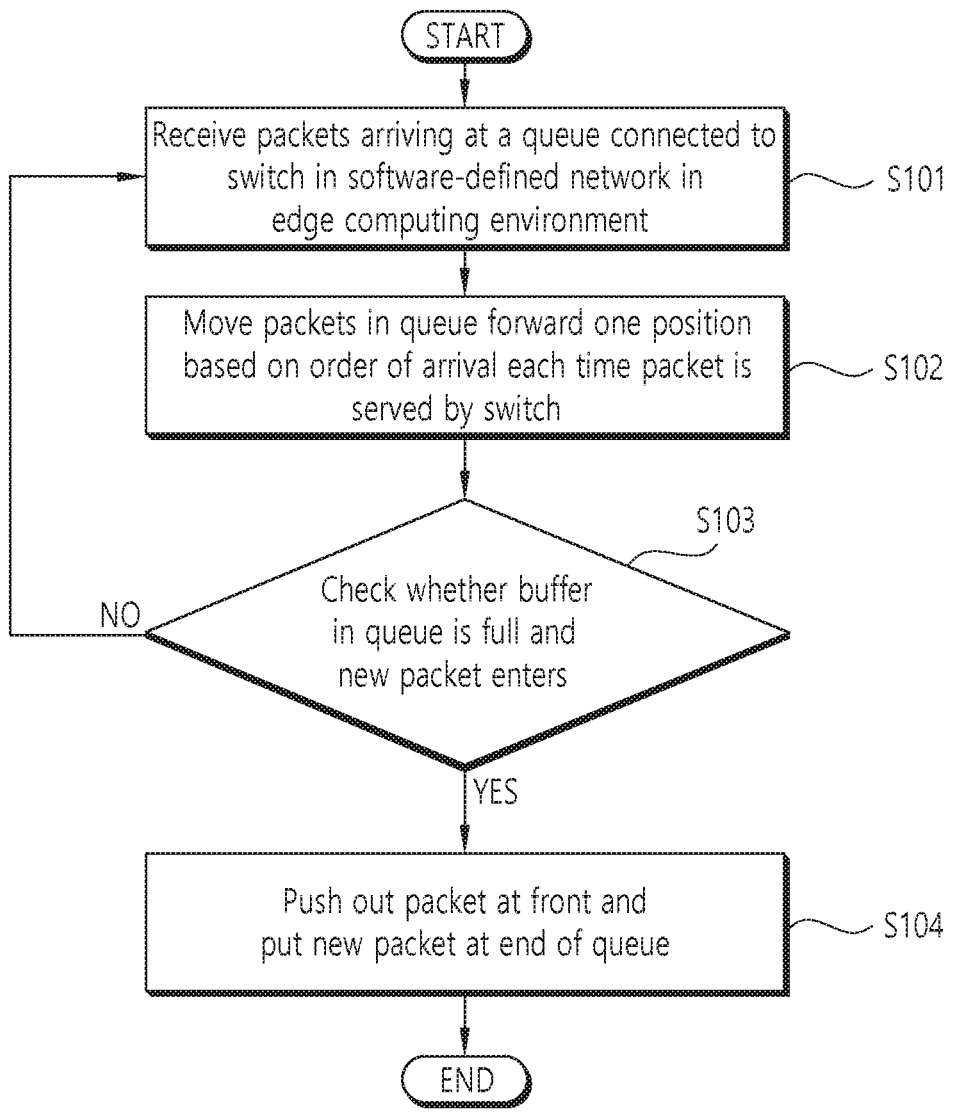
FIG. 7 is a flowchart illustrating a method for FCFS-PO packet scheduling for software-defined networking according to an exemplary embodiment of the present disclosure.

FIG. 7 is a flowchart illustrating a method for FCFS-PO packet scheduling for software-defined networking according to an exemplary embodiment of the present disclosure.

The method for First Come First Served-Pushout (FCFS-PO) packet scheduling for software-defined networking will be described below.

In Step S101, a packet scheduling apparatus receives packets arriving at a queue connected to a switch 120 in a software-defined network in an edge computing environment.

In Step S102, the packet scheduling apparatus moves the packets in the queue forward one position based on the order of arrival each time a packet is served by the switch 120.

In Step S103, the packet scheduling apparatus checks whether the buffer in the queue is full and a new packet enters.

In Step S104, if the buffer in the queue is full and a new packet enters, the packet scheduling apparatus pushes out the packet at the front and puts the new packet at the end of the queue. On the other hand, if the buffer in the queue is full and there is no newly incoming packet, the packet scheduling apparatus returns to Step S101.

Here, the switch 120 may be multiple switches operating according the OpenFlow protocol in the software-defined network. The FCFS-PO mechanism is modeled assuming that the packets follow the arrival rate of the Poisson process, and the interarrival times of the packets are independent and follow exponential distribution. The average service time of the packets in the queue may comprise the time required for the processing of the packets waiting in the queue at the time of the packet arrival, and the time required for the processing of the packet in service. The average service time of the packets in the queue can be calculated by the number of packets in the queue, the probability that the queue is busy, and the average residual lifetime of the service.

Figure 8:
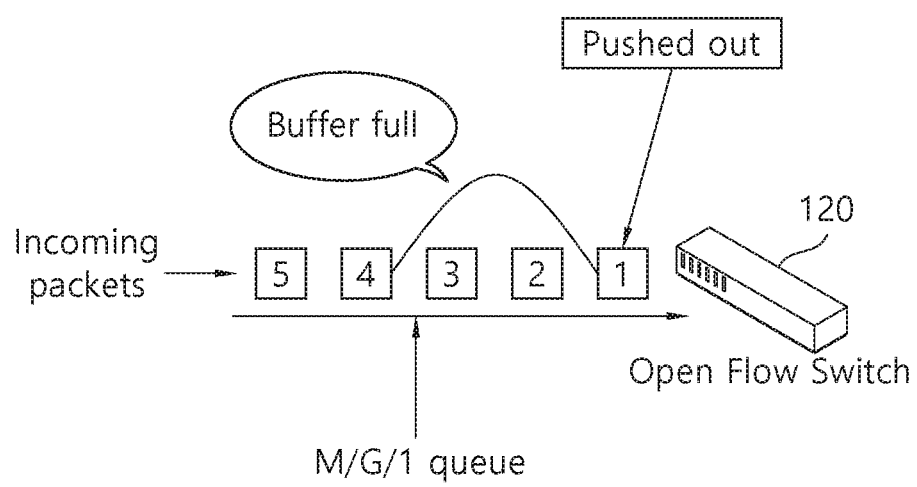
FIG. 8 is a view illustrating an FCFS-PO packet scheduling operation for software-defined networking according to an exemplary embodiment of the present disclosure.

FIG. 8 is a view illustrating an FCFS-PO packet scheduling operation for software-defined networking according to an exemplary embodiment of the present disclosure.

With FCFS-PO, if the buffer is full when a packet enters, it is put at the tail of the queue while the packet at the head is pushed out. All the packets move forward one position when a packet is served. Here, the position of a packet in the buffer is decided by the number of waiting packets.

The FCFS-PO mechanism is modeled assuming that the packets arriving at the switch follow the Poisson arrival with the rate of $\lambda(\lambda>0)$. This means that the interarrival times are independent and follow exponential distribution. The packet service times are also independent and follow general distribution $(1/\lambda)$. Also, assume that the system can contain N packets at most and the buffer size is (N−1). At last, the arrival process and service process are assumed to be independent.

Assume that $Q_i(1 \leq i \leq (N-1))$ is the steady state probability of the M/G/1/N queue, while $p_i(1 \leq i \leq (N-1))$ represents the steady state probability of the M/G/1 queue, which is given by the following [Equation 7]:

$$Q_i = \frac{P_i}{\sum_{i=0}^{N-1} P_i}, \quad [\text{Equation 7}]$$

$$1 \leq i \leq (N-1)$$

$Qa=(1 \leq a \leq N)$ is the steady state probability of a packets already in the system when a new packet arrives. Then, according to the Poisson Arrivals See Time Averages (PASTA), the following [Equation 8] can be obtained:

$$Q_a = \frac{Q_a}{Q_0 + \rho}, \quad [\text{Equation 8}]$$

$$a = 0, 1, 2, \ldots, (N-1)$$

-continued $$Q_N = 1 - \frac{1}{Q_0 + \rho}, \quad a = N.$$

Here, $\rho=(\lambda/\mu)$. And two performance indicators of the queue in the steady state are dealt with as in [Equation 9] and [Equation 10]:

(i) The probability of the packets to get the service, Px, $$P_x = \frac{1}{(Q_0 + \rho)} \quad [\text{Equation 9}]$$

(ii) The packet loss rate of the system, $P_l$, $$P_l = 1 - P_x = 1 - \frac{1}{Q_0 + \rho} \quad [\text{Equation 10}]$$

With the FCFS-PO mechanism, when the buffer is full of packets, the incoming packet will be put at the end, and the buffer management policy will push out the head-of-line (HOL) packet for the newly incoming packet. Let us denote by $P_s(a,b)$ the steady state probability for the packet in state (a,b), and it finally gets the service when a packet leaves the system. When a=1, the packet is in service. When $2 \leq a \leq N$ and $0 \leq b \leq (N-a)$, $P_s(a,b)$ needs to wait for the service. Assume that there are m incoming packets while a packet is in service. Then, $m \leq (N-b-2)$ for $P_s(a,b)$ to get the service. If $m \leq (N-a-b)$, there is no packet to be pushed out. Then, the position of the packet is changed from (a,b) to (a−1,b+m). The buffer is full while $(N-a-b)+1 \leq m \leq (N-b-2)$, and the incoming packet pushes out the packet at position 2. Then, the position of the packet is changed from (a,b) to (N−m−b−1,b+m). Finally, the state-transition equation of $P_s(a,b)$ is obtained as in the following [Equation 11]:

$$P_s(a, b) = \prod \alpha_m \cdot (m \mid (a, b)) + \sum_{m=N-a-b+1}^{N-b-2} \alpha_m \cdot P_s(N - m - b - 1, b + m) \quad [\text{Equation 11}]$$

The Boolean function given by the following [Equation 12] is used to show if the packet was served or not:

$$L = \begin{cases} 0 & \text{Served} \\ 1 & \text{Not served} \end{cases} \quad [\text{Equation 12}]$$

Using [Equation 9] and [Equation 10], the probability of P(L=0) and P(L=1) functions can be easily obtained.

Let $B_n(n \geq 1)$ represent the number of incoming packets while n packets are being served, and R(t) is the remaining time of the current packet in service.

The Laplace-Stieltjes Transform(LST) of $b_a$ is obtained as in the following [Equation 13]:

$$b_a(\theta) = \left[ \int_0^\infty \frac{(\lambda c)^a}{a!} e^{-(\lambda+\theta)c} dR(t) \left| \frac{Q_n + \rho - 1}{Q_n + \rho} \right| \cdot \left( \frac{Q_n + \rho - 1}{Q_n + \rho} \right) \right] \quad [\text{Equation 13}]$$

Denote by H(a,b) the average waiting time for $P_s(a,b)$ until it finally gets the service, and the waiting time is no longer than t.

Then, the probability of H(a,b,θ) is shown as in the following [Equation 14]:

$$H(a,b,\theta) = \int_0^\infty e^{-\theta t} dH(a,b,\theta)$$ [Equation 14]

So, H(a,b) can be obtained as in the following [Equation 15]:

$$H(a,b) = -\lim_{\theta \to 0} H(a,b,\theta)$$ [Equation 15]

The conditional average waiting time for $P_s(a,b)$ is as in the following [Equation 16].

$$T = \rho \cdot \sum_{a=1}^{N-1} \sum_{b=0}^{N-a-1} Q_a \left[ b_a \cdot H(a,b) + P_s(a,b) \cdot \frac{(b+1)}{\lambda} \cdot b_{b+1} \right] +$$
$$\rho \cdot \sum_{a=1}^{N-1} \sum_{b=N-a}^{N-2} Q_a \left[ b_a \cdot H(N-b-1,b) + P_s(N-b-1,b) \cdot \frac{(b+1)}{\lambda} \cdot b_{b+1} \right] +$$
$$\rho \cdot \sum_{b=0}^{N-2} Q_N \left[ b_a H(N-b-1,b) + P_s(N-b-1,b) \cdot \frac{(b+1)}{\lambda} \cdot b_{b+1} \right].$$ [Equation 16]

Here $Q_a$ and $b_a$ (1≤a≤N) are given by [Equation 8] and [Equation 13], respectively. H(a,b) is given by [Equation 15].

Figure 9:
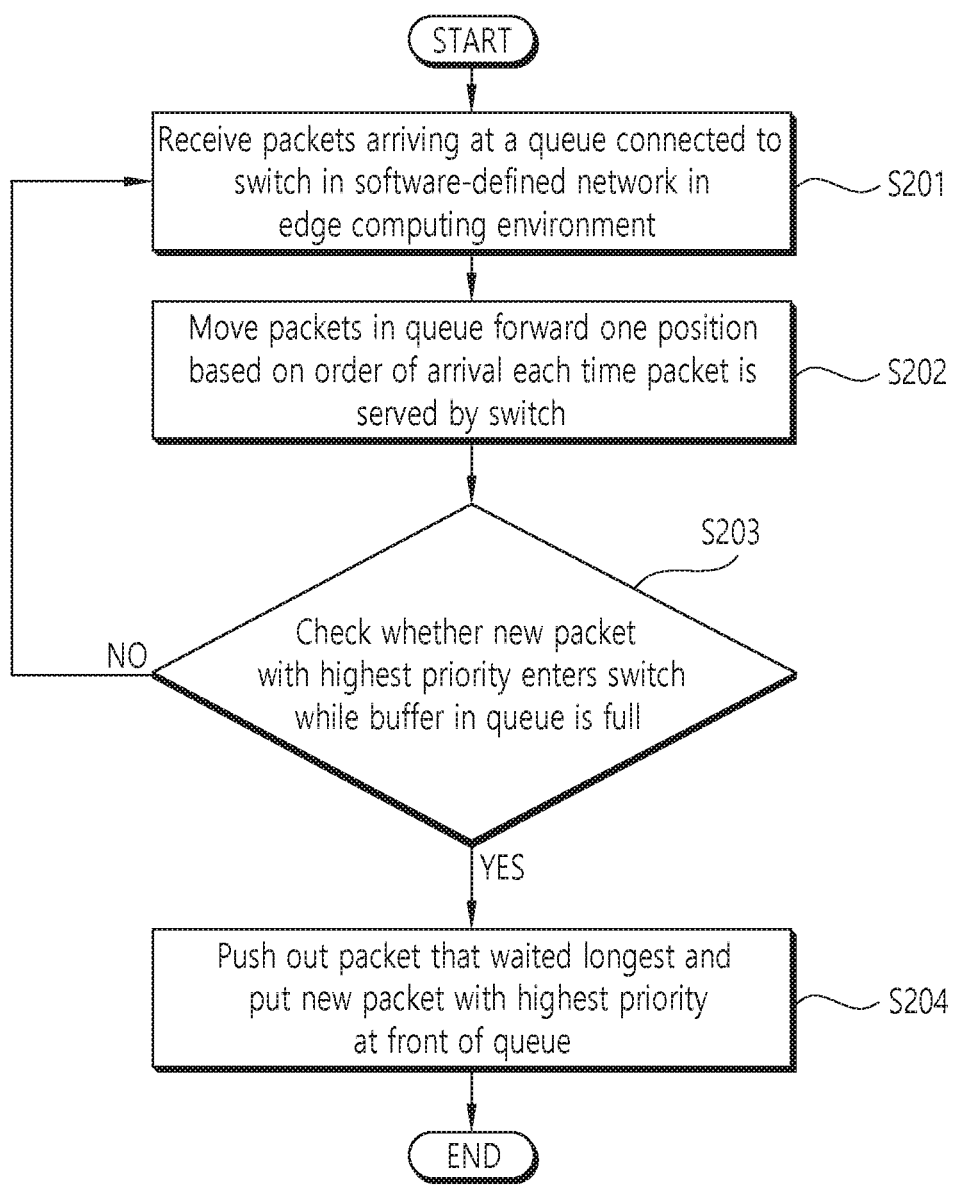
FIG. 9 is a view illustrating a method for FCFS-PO-P packet scheduling for software-defined networking according to an exemplary embodiment of the present disclosure.

FIG. 9 is a view illustrating a method for FCFS-PO-P packet scheduling for software-defined networking according to an exemplary embodiment of the present disclosure.

The method for First Come First Served-Pushout-Priority (FCFS-PO-P) packet scheduling for software-defined networking will be described below.

In Step S201, a packet scheduling apparatus receives packets arriving at a queue connected to a switch 120 in a software-defined network in an edge computing environment.

In Step S202, the packet scheduling apparatus moves the packets in the queue forward one position based on the order of arrival each time a packet is served by the switch 120.

In Step S203, the packet scheduling apparatus checks whether a new packet with the highest priority enters the switch 120 while the buffer in the queue is full.

In Step S204, if a new packet with the highest priority enters the switch 120 while the buffer in the queue is full, the packet scheduling apparatus pushes out the packet that waited longest and puts the new packet with the highest priority at the front of the queue. On the other hand, if there is no newly incoming packet with the highest priority to the switch 120 while the buffer is full, the packet scheduling apparatus returns to Step S201.

Here, the switch 120 may be multiple switches operating according the OpenFlow protocol in the software-defined network. The FCFS-PO-P mechanism is modeled assuming that the packets follow the arrival rate of the Poisson process, and the interarrival times of the packets are independent and follow exponential distribution. The average service time of the packets in the queue may comprise the time taken for the packet currently in service to be finished, the time taken for the service of the packets in the queue having equal or higher priority, and the time taken for the service of the packets in the queue having higher priority. The average service time of the packets in the queue can be calculated by the number of packets in the queue, the probability that the queue is busy, and the average residual lifetime of the service.

Figure 10:
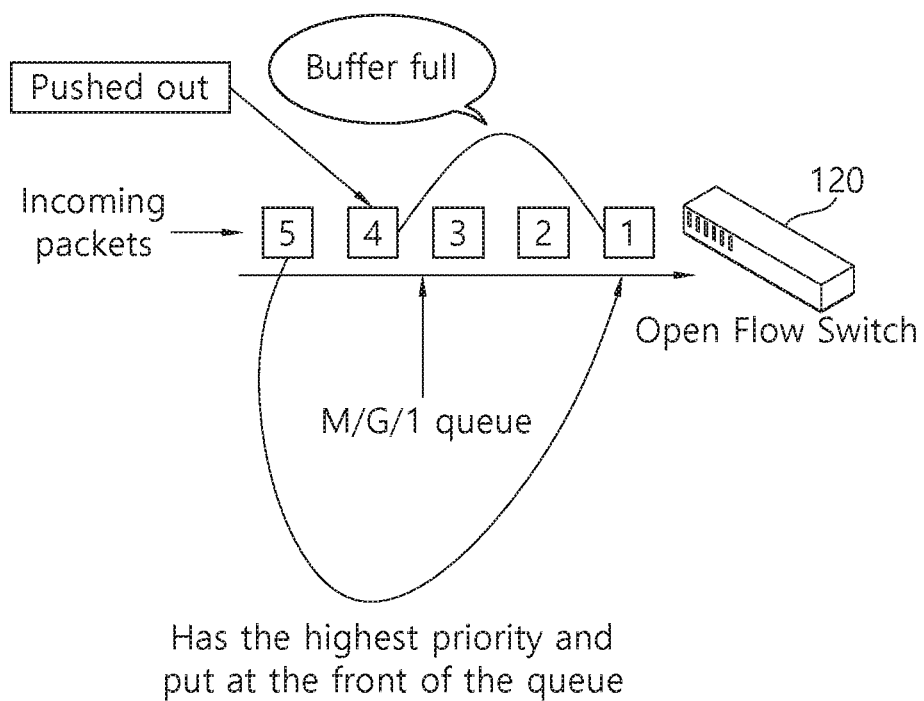
FIG. 10 is a view illustrating an FCFS-PO-P packet scheduling operation for software-defined networking according to an exemplary embodiment of the present disclosure.

FIG. 10 is a view illustrating an FCFS-PO-P packet scheduling operation for software-defined networking according to an exemplary embodiment of the present disclosure.

The FCFS-PO-P packet scheduling operation will be described. In the modeling of FCFS-PO-P, the arrival process and service process of the incoming packets are the same as the modeling of FCFS-PO. In this paper, assume that the newly incoming packet has the highest priority among the packets already in the queue. Then, the newly incoming packet will be put in the front position to get service first. And the buffer management policy pushes out the packet in position N which waited longest in the queue. Let $P_s(a)$ denote the steady state probability of packet in position a and it is finally served. With the FCFS-PO-P policy, $P_s(a)$(2≤a≤N) waits in the sequence. Assume that m incoming packets arrived while a packet is in service. Then, m≤(N−a) for the packet to be served, and $P_s(a)$ moves to position (a+m−1) when the service ends. The state-transition equation of $P_s(a)$ is as in the following [Equation 17]:

$$P_s(a) = \prod \alpha_m \cdot (m \mid (a,b)) + \sum_{m=0}^{N-a} \alpha_m \cdot P_s(a+m-1),$$ [Equation 17]
$$a = 2, 3, \ldots, N$$

Now, the average waiting time is analyzed. The probability of $P_s(a)$ to get the service and the service time not being larger than t is G(a,c). Assume that the following [Equation 18] is the LST of G(a,c):

$$h(a,\theta) = \int_0^\infty e^{-\theta c} dG(a,c)$$ [Equation 18]

The recursive equation of h(a,θ) is obtained as in the following [Equation 19]

$$h(a,\theta) = \sum_{m=0}^{N-a} \alpha_m(\theta) \cdot h(a+m-1,\theta), a = 2, 3, \ldots, N$$ [Equation 19]

Let H(a) denote average waiting time for $P_s(a)$, which is given by the following [Equation 20]:

$$H(a) = -\lim_{\theta \to 0} h(a,\theta)$$ [Equation 20]

At last, the average waiting time for $P_s(a)$ is as in the following [Equation 21]:

$$T = \rho \cdot \sum_{a=0}^{N-2} b_a H(a+1) + P_s(a+1) \cdot \frac{(a+1)}{\lambda} \cdot b_{a+1}$$ [Equation 21]

Figure 11:
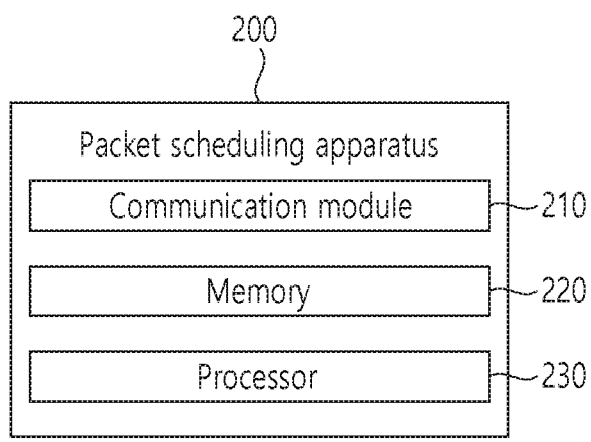
FIG. 11 is a view illustrating a configuration of a packet scheduling apparatus for software-defined networking in an edge computing environment according to an exemplary embodiment of the present disclosure.

FIG. 11 is a view illustrating a configuration of a packet scheduling apparatus for software-defined networking in an edge computing environment according to an exemplary embodiment of the present disclosure.

As illustrated in FIG. 11, an FCFS-PO packet scheduling apparatus 200 according to an exemplary embodiment of the present disclosure comprises a memory 220 and a processor 230. However, not all of the illustrated components are essential components. The packet scheduling apparatus 200 may be implemented by more or fewer components than the illustrated components.

Hereinafter, a detailed configuration and operation of each of the elements of the FCFS-PO packet scheduling apparatus 200 of FIG. 11 will be described.

The memory 220 stores at least one program.

The processor 230 is connected to the memory 220. The processor 230 receives packets arriving at a queue connected to a switch 120 in a software-defined network in an edge computing environment, moves the packets in the queue forward one position based on the order of arrival each time a packet is served by the switch 120, and, if a new packet enters the switch 120 while the buffer in the queue is full, pushes out the packet at the front and puts the new packet at the end of the queue.

According to the exemplary embodiments, the switch 120 may be multiple switches 120 operating according the OpenFlow protocol in the software-defined network.

According to the exemplary embodiments, the FCFS-PO mechanism is modeled assuming that the packets follow the arrival rate of the Poisson process, and the interarrival times of the packets are independent and follow exponential distribution.

According to the exemplary embodiments, the average service time of the packets in the queue may comprise the time required for the processing of the packets which are waiting in the queue at the time of the packet arrival, and the time required for the processing of the packet in service.

According to the exemplary embodiments, the average service time of the packets in the queue may be calculated by the number of packets in the queue, the probability that the queue is busy, and the average residual lifetime of the service.

Meanwhile, an FCFS-PO-P packet scheduling apparatus 200 according to another exemplary embodiment of the present disclosure comprises a memory 220 and a processor 230. However, not all of the illustrated components are essential components. The packet scheduling apparatus 200 may be implemented by more or fewer components than the illustrated components.

Hereinafter, a detailed configuration and operation of each of the elements of the FCFS-PO packet scheduling apparatus 200 of FIG. 11 will be described.

The memory 220 stores at least one program.

The processor 230 is connected to the memory 220. The processor 230 receives packets arriving at a queue connected to a switch 120 in a software-defined network in an edge computing environment, moves the packets in the queue forward one position based on the order of arrival each time a packet is served by the switch 120, and, if a new packet with the highest priority enters the switch 120 while the buffer in the queue is full, pushes out the packet that waited longest and puts the new packet with the highest priority at the front of the queue.

According to the exemplary embodiments, the switch 120 may be multiple switches 120 operating according the OpenFlow protocol in the software-defined network.

According to the exemplary embodiments, the FCFS-PO-P mechanism is modeled assuming that the packets follow the arrival rate of the Poisson process, and the interarrival times of the packets are independent and follow exponential distribution.

According to the exemplary embodiments, the average service time of the packets in the queue may comprise the time taken for the packet currently in service to be finished, the time taken for the service of the packets in the queue having equal or higher priority, and the time taken for the service of the packets in the queue having higher priority.

According to the exemplary embodiments, the average service time of the packets in the queue may be calculated by the number of packets in the queue, the probability that the queue is busy, and the average residual lifetime of the service.

Meanwhile, the performance evaluation of a packet scheduling method according to an exemplary embodiment of the present disclosure will be described. The performance of the proposed scheduling schemes for the OpenFlow switch is evaluated.

In an experiment environment, a testbed is implemented with three Raspberry Pi nodes for the experiment. The data with the priority scheduling are collected from the testbed, and they are compared with the analytical models. An OpenFlow switch is installed in the Raspberry Pi node to implement the real switch with the OpenFlow protocol. The OpenFlow switch is a multilayer, open source virtual switch targeting all major hypervisor platforms. It was designed for networking in virtual environment, and thus it is quite different from the traditional software switch architecture.

For the experiment, one remote controller and three OpenFlow switches are implemented. Three Raspberry Pi nodes operate as the OpenFlow switches, and Floodlight was installed in another computer working as a remote controller. Floodlight is a Java-based open source controller, and it is one of the most popular SDN controller supporting physical and virtual OpenFlow compatible switches. It is based on the Bacon controller from Stanford University. Note that four network interfaces are supplied with the Raspberry Pi node. Therefore, three OpenFlow switches are installed for collecting data, and one interface is used to be connected to the controller network. The network traffics are generated by the software tool "iPerf". One host is selected as the server and another as the terminal by iPerf. Then, the host sends packets to the server by the UDP protocol in the bandwidth of 200 Mbps. The simulation results will now be described. First, the simulation results of the proposed scheduling algorithm with a single switch are presented.

Figure 12:
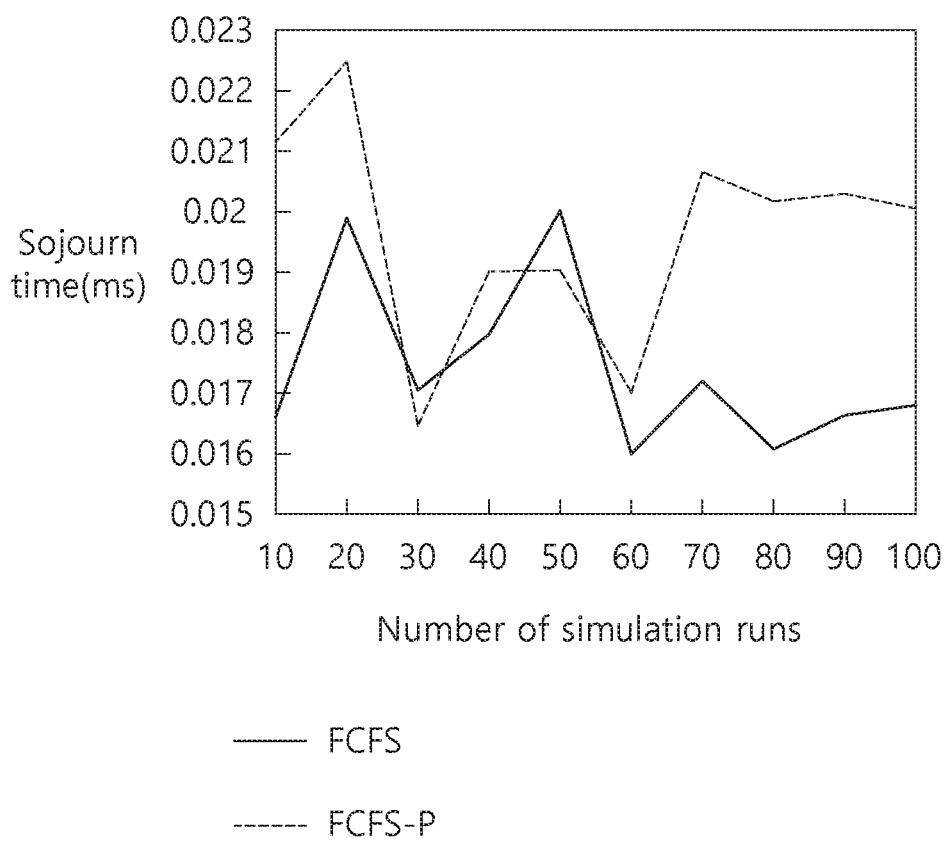
FIG. 12 is a view comparing the FCFS and FCFS-P scheduling algorithms.

FIG. 12 is a view comparing the FCFS and FCFS-P scheduling algorithms.

Notice that the FCFS-P algorithm mostly causes longer sojourn time than the FCFS algorithm. The FCFS-P algorithm occasionally displays similar performance to FCFS when the incoming packets have high priority.

Figure 13:
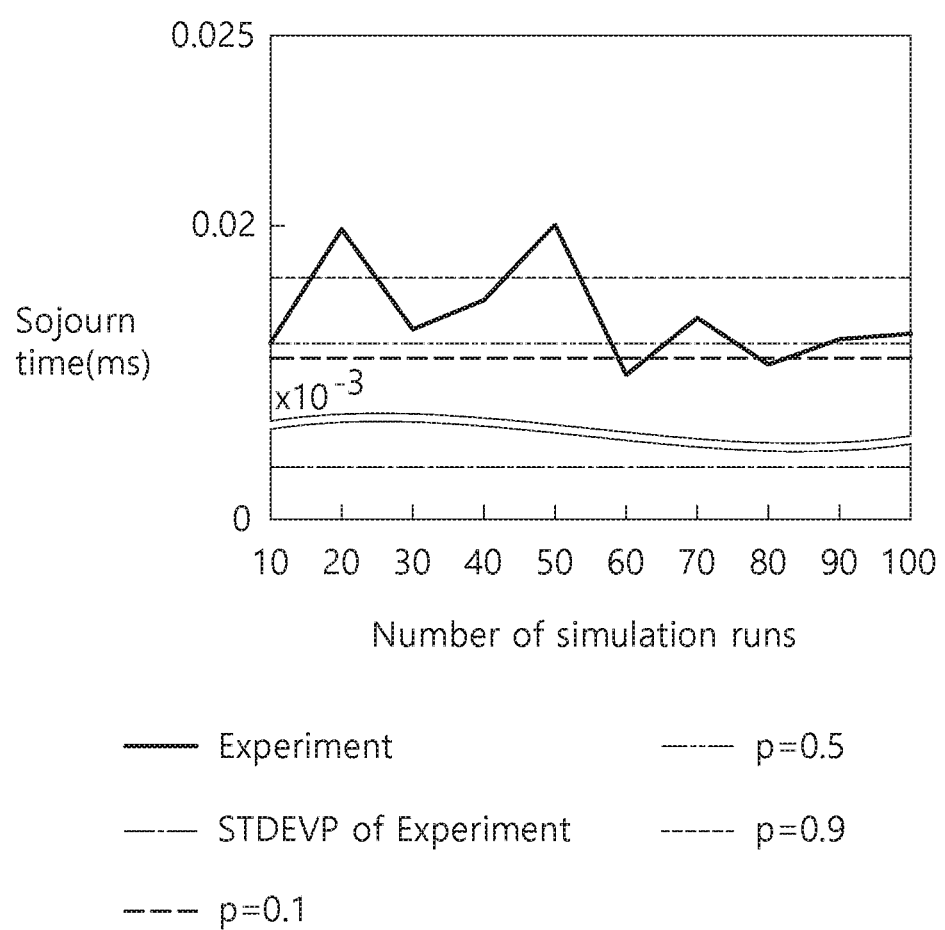
FIG. 13 is a view comparing the data from the experiment and analytical model using FCFS.

FIG. 13 is a view comparing the data from the experiment and analytical model using FCFS.

FIG. 13 compares the data from the experiment and analytical model. As aforementioned, three variables, $\lambda$, $\bar{x}$, and $\rho$, are used in the FCFS scheduling algorithm. Similar to the previous research, $\lambda$ and $\bar{x}$ are empirically set to be 2 and 0.016, respectively. $\rho$ is set to be 0.1, 0.5, and 0.9 to check the performance with various conditions. It reveals that the data stabilizes as the simulation time passes, and $\rho$ of 0.5 allows the closest estimation.

Figure 14:
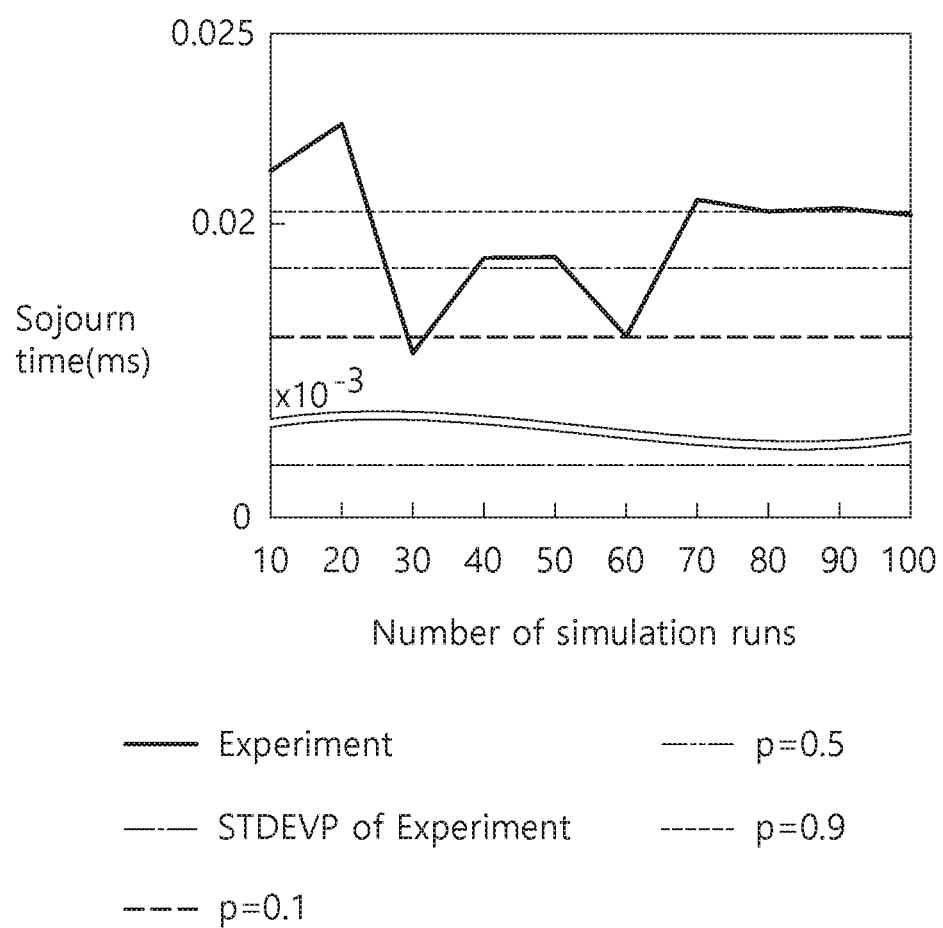
FIG. 14 is a view comparing the data from the experiment and analytical model using FCFS-P.

FIG. 14 is a view comparing the data from the experiment and analytical model using FCFS-P.

FIG. 14 is for the case of FCFS-P. Here, the values of $\omega_0$, $\bar{x}_i$, $\lambda i$, and $Si$ are 0.02, 0.018, 0.016, and 2, respectively. In this case, $\rho$ of 0.9 shows the best result. Assume that N=10 and $\mu$=5.

Figure 15:
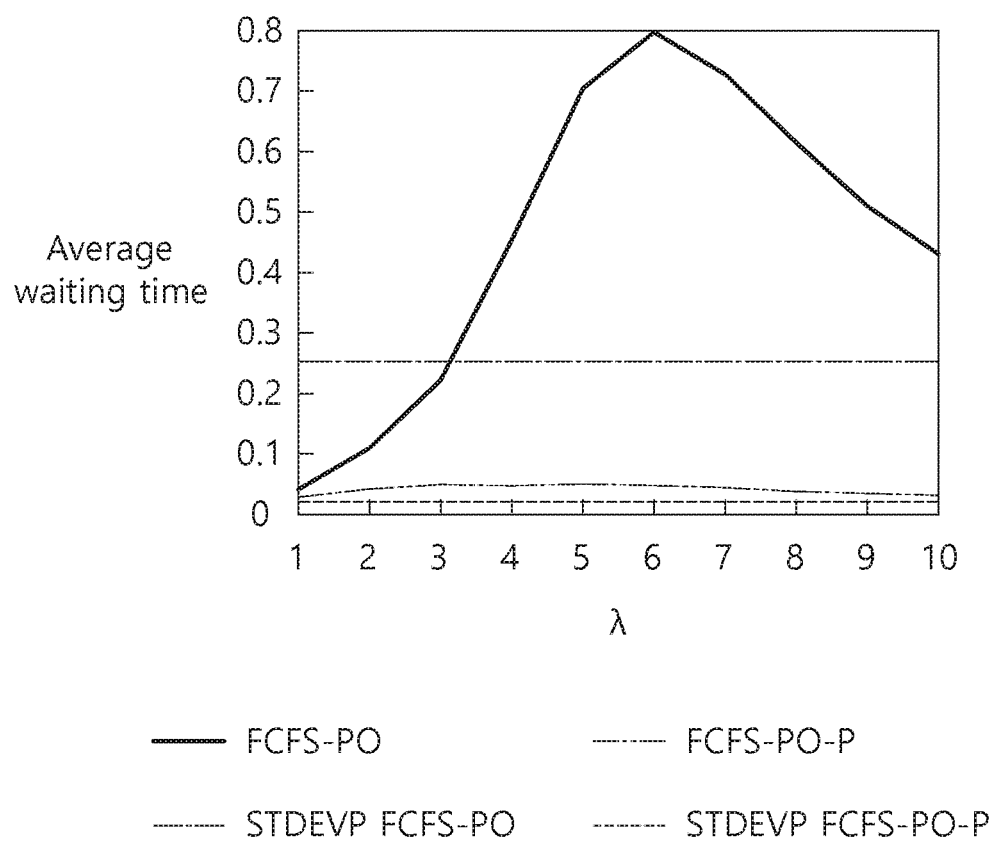
FIG. 15 is a view comparing the waiting time using FCFS-PO and the waiting time using FCFS-PO-P according to an exemplary embodiment of the present disclosure.

FIG. 15 is a view comparing the waiting time using FCFS-PO and the waiting time using FCFS-PO-P according to an exemplary embodiment of the present disclosure.

FIG. 15 compares FCFS-PO and FCFS-PO-P as $\lambda$ varies. Observe from FIG. 15 that the average waiting time with FCFS-PO-P is smaller than with the FCFS-PO mechanism. The probability density function of wait time with FCFS-PO in the steady state is as in the following [Equation 22]:

$$W(t) = \sum_{n=1}^{N-1} V_n[B^{(n-1)}(t) \cdot R(t)] + V_0 \quad \text{[Equation 22]}$$

where $B_{(n)}(t)$ is the n-fold convolution of B(t) and B(t)·R(t), and R(t) is the convolution of B(t) and R(t). The incoming packet will be processed directly if there is no packet waiting in the system, which means that the waiting time of the packet is 0. $V_0$ is the probability of the system to be idle, and $V_n$ is the probability that there are n(1≤n≤(N−1)) packets waiting in the system. Then, the incoming packet will wait at position_(n+1). The total wait time consists of the remaining service time and the service time of the packet in front of it. The average wait time can then be obtained as in the following [Equation 23]:

$$T(t) = \int_0^\infty t dW(t) \quad \text{[Equation 23]}$$

Figure 16:
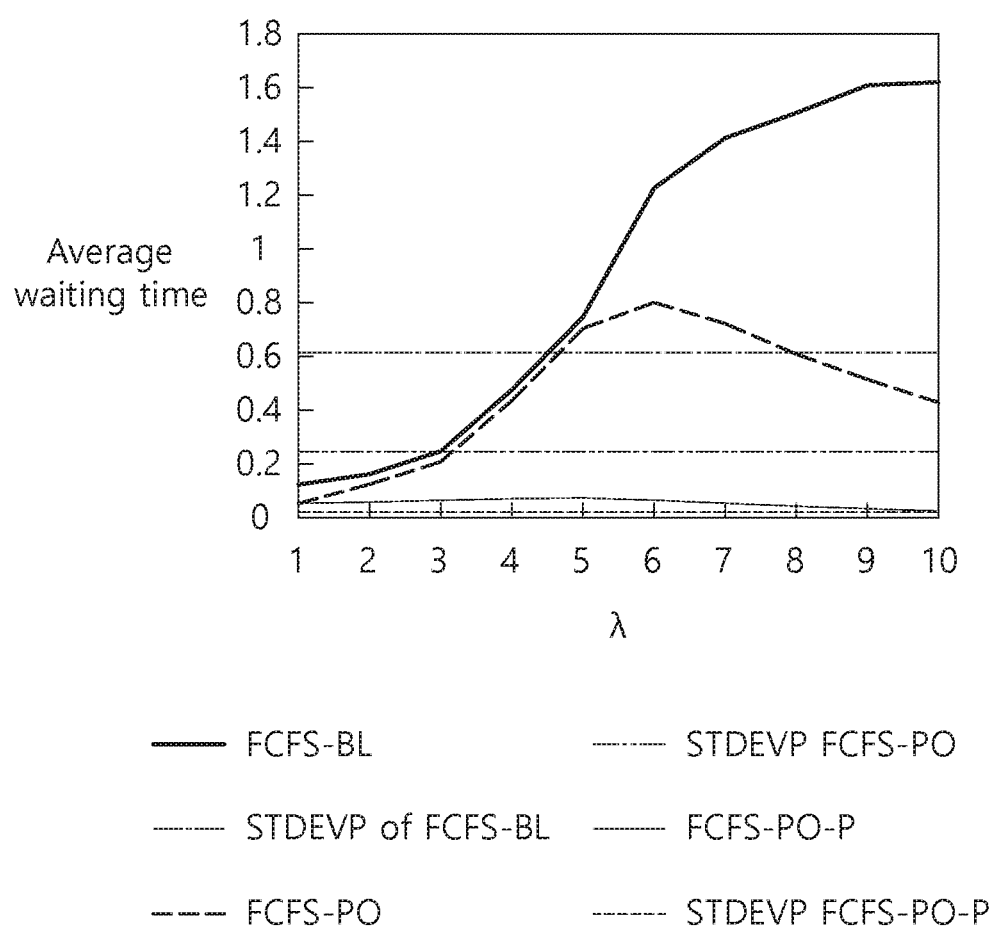
FIG. 16 is a view comparing FCFS-PO-P and FCFS-PO scheduling methods according to an exemplary embodiment of the present disclosure with a conventional FCFS-BL scheduling algorithm.

FIG. 16 is a view comparing FCFS-PO-P and FCFS-PO scheduling methods according to an exemplary embodiment of the present disclosure with a conventional FCFS-BL scheduling algorithm.

With FCFS-BL (FCFS-Block), the incoming packet is lost if the buffer is full. Notice from FIG. 16 that the FCFS-PO scheduling method, which is a pushout mechanism, is more effective than the BL mechanism. Particularly, the superiority gets higher as $\lambda$ increases. Generally speaking, the FCFS-PO-P mechanism is the best among the three mechanisms.

The above-described packet scheduling methods for software-defined networking in an edge computing environment according to the exemplary embodiments of the present disclosure can be embodied as computer readable code on a computer readable medium. The packet scheduling methods for software-defined networking in an edge computing environment according to the exemplary embodiments of the present disclosure can be embodied as programmed commands to be executed in various computer means, and then can be recorded to a computer-readable recording medium.

There is provided a non-transitory computer-readable storage medium comprising at least one program executable by a processor, wherein the at least one program comprises instructions which, when executed by the processor, to receive packets arriving at a queue connected to a switch in a software-defined network in an edge computing environment, move the packets in the queue forward one position based on the order of arrival each time a packet is served by the switch, and, if the buffer in the queue is full and a new packet enters the switch, push out the packet at the front and put the new packet at the end of the queue.

The above-described methods according to the exemplary embodiments of the present disclosure can be embodied as computer readable code on a computer readable medium. The computer-readable recording medium includes all kinds of recording media storing data that can be decoded by a computer system. For example, there may be a ROM (Read Only Memory), a RAM (Random Access Memory), a magnetic tape, a magnetic disk, a flash memory, an optical data storage device and the like. The computer-readable recording medium may also be distributed in a computer system connected to a computer network and stored and executed as a code that can be read in a distributed manner.

While the present disclosure has been described with reference to the accompanying drawings and exemplary embodiments, it is to be understood that the scope of protection of the disclosure is not limited by the accompanying drawings and embodiments. It will be understood by those skilled in the art that various changes in form and details may be made therein without departing from the spirit and scope of the disclosure as defined by the appended claims.

In particular, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

While the present disclosure has been described on the basis of a series of functional blocks, it is not limited by the embodiments described above and the accompanying drawings and it will be apparent to those skilled in the art that various substitutions, modifications and variations can be made without departing from the scope of the present disclosure.

The combination of the above-described embodiments is not limited to the above-described embodiments, and various forms of combination in addition to the above-described embodiments may be provided according to implementation and/or necessity.

In the above-described embodiments, the methods are described on the basis of a flowchart as a series of operations or blocks, but the present disclosure is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present disclosure.

The above-described embodiments include examples of various aspects. While it is not possible to describe every possible combination for expressing various aspects, one of ordinary skill in the art will recognize that other combinations are possible. Accordingly, it is intended that the present disclosure include all alternatives, modifications and variations that fall within the scope of the following claims.

The exemplary embodiments of the present disclosure can significantly reduce wait time in consideration of various traffic characteristics by performing packet scheduling for multiple switches in software-defined networking in an edge computing network.

What is claimed is:

1. A packet scheduling method executed by a packet scheduling apparatus for software-defined networking in an edge computing environment, the method comprising:
   receiving, in a software-defined network, packets arriving at a queue connected to a switch in the software-defined network in an edge computing environment;
   moving the packets in the queue forward one position based on an order of arrival each time a packet is served by the switch; and
   if a new packet enters the switch while a buffer of the queue is full, pushing out a packet at a front of the queue and putting the new packet at an end of the queue,
   wherein the switch performs lookup of the packets within flow tables within the switch and if no entry in any of the flow tables matches, the switch sends a packet-in message to a controller in the software-defined network, and
   the packet-in message is queued.

2. The packet scheduling method of claim 1, wherein the switch is multiple switches operating according the Open-Flow protocol in the software-defined network.

3. The packet scheduling method of claim 1, wherein the packet is modeled as following an arrival rate of a Poisson process, and interarrival times of the packets are independent and follow exponential distribution.

4. The packet scheduling method of claim 1, wherein an average service time of the packets in the queue comprises the time required for the processing of the packets which are waiting in the queue at the time of the packet arrival, and the time required for the processing of the packet in service.

5. The packet scheduling method of claim 4, wherein the average service time of the packets in the queue is calculated by the number of packets in the queue, the probability that the queue is busy, and an average residual lifetime of the service.

6. A packet scheduling method executed by a packet scheduling apparatus for software-defined networking in an edge computing environment, the method comprising:
   receiving, in a software-defined network, packets arriving at a queue connected to a switch in the software-defined network in an edge computing environment;
   moving the packets in the queue forward one position based on an order of arrival each time a packet is served by the switch;
   receiving a new packet with a highest priority of priorities of the packets arriving at the queue while a buffer of the queue is full;
   pushing out a packet of the packets that waited longest; and
   putting the new packet with the highest priority at a front of the queue.

7. The packet scheduling method of claim 6, wherein the switch is multiple switches operating according the Open-Flow protocol in the software-defined network.

8. The packet scheduling method of claim 6, wherein the packet is modeled as following an arrival rate of a Poisson process, and interarrival times of the packets are independent and follow exponential distribution.

9. The packet scheduling method of claim 6, wherein an average service time of the packets in the queue comprises the time taken for the packet currently in service to be finished, the time taken for the service of the packets in the queue having equal or higher priority, and the time taken for the service of the packets in the queue having higher priority.

10. The packet scheduling method of claim 9, wherein the average service time of the packets in the queue is calculated by the number of packets in the queue, the probability that the queue is busy, and an average residual lifetime of the service.

11. A packet scheduling apparatus for software-defined networking in an edge computing environment, the apparatus comprising:
    a memory storing at least one program; and
    a processor connected to the processor,
    wherein the processor receives, in a software-defined network, packets arriving at a queue connected to a switch in the software-defined network in an edge computing environment, moves the packets in the queue forward one position based on an order of arrival each time a packet is served by the switch, and, if a new packet enters the switch while a buffer of the queue is full, pushes out a packet at a front of the queue and puts the new packet at an end of the queue,
    wherein the switch performs lookup of the packets within flow tables within the switch and if no entry in any of the flow tables matches, the switch sends a packet-in message to a controller in the software-defined network, and
    the packet-in message is queued.

12. The packet scheduling apparatus of claim 11, wherein the switch is multiple switches operating according the OpenFlow protocol in the software-defined network.

13. The packet scheduling apparatus of claim 11, wherein the packet is modeled as following an arrival rate of a Poisson process, and interarrival times of the packets are independent and follow exponential distribution.

14. The packet scheduling apparatus of claim 11, wherein an average service time of the packets in the queue comprises the time required for the processing of the packets which are waiting in the queue at the time of the packet arrival, and the time required for the processing of the packet in service.

15. The packet scheduling method of claim 14, wherein the average service time of the packets in the queue is calculated by the number of packets in the queue, the probability that the queue is busy, and an average residual lifetime of the service.

16. A packet scheduling apparatus for software-defined networking in an edge computing environment, the apparatus comprising:
a memory storing at least one program; and
a processor connected to the processor,
wherein the processor receives, in a software-defined network, packets arriving at a queue connected to a switch in the software-defined network in an edge computing environment, moves the packets in the queue forward one position based on an order of arrival each time a packet is served by the switch, receives a new packet with a highest priority of priorities of the packets arriving at the queue while a buffer of the queue is full, pushes out a packet of the packets that waited longest; and puts the new packet with the highest priority at a front of the queue.

17. The packet scheduling apparatus of claim 16, wherein the switch is multiple switches operating according the OpenFlow protocol in the software-defined network.

18. The packet scheduling apparatus of claim 16, wherein the packet is modeled as following an arrival rate of a Poisson process, and interarrival times of the packets are independent and follow exponential distribution.

19. The packet scheduling apparatus of claim 16, wherein an average service time of the packets in the queue comprises the time taken for the packet currently in service to be finished, the time taken for the service of the packets in the queue having equal or higher priority, and the time taken for the service of the packets in the queue having higher priority.

20. The packet scheduling apparatus of claim 19, wherein the average service time of the packets in the queue is calculated by the number of packets in the queue, the probability that the queue is busy, and an average residual lifetime of the service.

* * * * *